United States Patent [19]

Spies

[11] Patent Number: 5,797,122
[45] Date of Patent: Aug. 18, 1998

[54] METHOD AND SYSTEM USING SEPARATE CONTEXT AND CONSTITUENT PROBABILITIES FOR SPEECH RECOGNITION IN LANGUAGES WITH COMPOUND WORDS

[75] Inventor: Marcus Spies, Heidelberg, Germany

[73] Assignee: International Business Machines Corporation, Armonk, N.Y.

[21] Appl. No.: 737,840

[22] PCT Filed: Jun. 7, 1995

[86] PCT No.: PCT/EP95/02184

§ 371 Date: Nov. 18, 1996

§ 102(e) Date: Nov. 18, 1996

[87] PCT Pub. No.: WO96/29695

PCT Pub. Date: Sep. 26, 1996

[30] Foreign Application Priority Data

Mar. 20, 1995 [DE] Germany ............... 195 10 083.2

[51] Int. Cl.⁶ ............................................. G10L 5/06
[52] U.S. Cl. .................................... 704/255; 704/252
[58] Field of Search ........................... 704/251, 252, 704/255, 256, 257

[56] References Cited

FOREIGN PATENT DOCUMENTS

| | | | |
|---|---|---|---|
| 0 421 744 A2 | 10/1989 | European Pat. Off. | G10L 5/06 |
| 0 453 649 A2 | 10/1991 | European Pat. Off. | G10L 5/06 |
| 0 590 925 A1 | 4/1994 | European Pat. Off. | G10L 5/06 |
| 0 931 850 A1 | 9/1993 | WIPO | G10L 5/06 |

OTHER PUBLICATIONS

P. Geutner, "Using Morphology Towards Better Large-Vocabulary Speech Recognition Systems," Proc. ICASSP 95, pp. 445–448, May 1995.

Wayne Ward and Sunil Issar, "A Class Based Language Model for Speech Recognition," Proc. ICASSP 96, pp. 416–418, Jun. 1996.

Andre Breton, Pablo Fetter, and Peter Regel-Brietzmann, "Compound Words in Large-Vocabulary German Speech Recognition Systems," Proc. Fourth International Conference on Spoken Language Processing (ICSLP 96), Oct. 1996.

Kai Hubener, Uwe Jost, and Henrik Heine, "Speech Recognition for Spontaneously Spoken German Dialogues," Proc. Fourth International Conference on Spoken Language Processing (ICSLP 96), Oct. 1996.

*Primary Examiner*—David R. Hudspeth
*Assistant Examiner*—Talivaldis Ivars Smits
*Attorney, Agent, or Firm*—James E. Murray

[57] ABSTRACT

In a method and system for speech recognition in the case of languages containing compound words only components of compound words are stored in a language model. Only these components are handled in the vocabulary.

In recognizing possible compound words separate processing paths are set up for the corresponding components of compound words and for possible individual words, in which specific language model statistics are calculated. The basis for the language model statistics is the breakdown of the probabilities, in which the context and the constituents of a compound word are taken into account separately. For this, use is made of the fact, known from linguistics, that grammar-determining components of a compound word are, as a rule, to be found at the end of the compound word, where this constituent of the compound word provides information on gender, case and number of the compound word.

The invention is particularly suitable for real-time speech recognition in discrete and continuous dictation.

16 Claims, 1 Drawing Sheet

METHOD AND SYSTEM USING SEPARATE CONTEXT AND CONSTITUENT PROBABILITIES FOR SPEECH RECOGNITION IN LANGUAGES WITH COMPOUND WORDS

FIELD OF THE INVENTION

The present invention relates to a speech recognition method suitable for compound words which can be employed for either discrete or continuous dictation and is suitable, in particular, for real-time speech recognition. The invention also relates to a speech recognition system for the use of this method.

BACKGROUND OF THE INVENTION

The invention is based on the TANGORA speech recognition system developed by the Applicant. TANGORA is a real time speech recognition system for large vocabularies of more than 20,000 word forms which can be speaker-trained with little cost to the user.

The starting point in these known systems is the breakdown of the speech recognition process into a part based on acoustic data (decoding) and a language statistics part referring back to bodies of language or text for a specific area of application (language model). The decision on candidate words is thus derived both from a decoder and a model language probability. For the user, the fitting of the vocabulary processed by this recognition system, to the specific field or even to individual requirements, is of particular significance.

With this speech recognition system the acoustic decoding first supplies hypothetical words. The further evaluation of competing hypothetical words is then based on the language model. This represents estimates of word string frequencies obtained from application-specific bodies of text based on a collection of text samples from a desired field of application. From these text samples are generated the most frequent forms of words and statistics on word sequences.

In the method used here for estimating the frequency of sequences of words the frequency of occurrence of the so-called word form trigrams in a given text are estimated (see, i.a. Na-das, A., "On Turing's Formula for Word Probabilities", IEEE Proc. ASSP, 33, 6, 1985, pp. 1414–1416). With a vocabulary of 20,000 word forms, as currently employed in the TANGORA speech recognition system, however, about 8 billion trigrams are possible. The corpora which are collected in practice are therefore still always some orders of magnitude too small even to be able to observe all trigrams.

This problem of the limited vocabulary is tackled, inter alia, by creating so-called object classes which appear in the corpus of the language with equal frequency. The estimate is here based on the assumption of a binomial distribution of a random variable which generally describes the drawing of an object from a frequency class.

In known speech recognition systems the so-called Hidden-Markov-Model is frequently used for estimating the probabilities. Here, several frequencies observed in the text are set down. For a trigram "uvw" these are a nullgram term $f_0$, a unigram term $f(w)$, a bigram term $f(w|v)$ and a trigram term $f(w|uv)$. These terms correspond to the relative frequencies observed in the text, where the nullgram term has only a corrective significance.

If these terms are interpreted as probabilities of the word w under various conditions, a so-called latent variable can be added, from which one of the four conditions which produce the word w is achieved by substitution. If the transfer probabilities for the corresponding term are designated $\lambda_0$ $\lambda_1$ $\lambda_2$ $\lambda_3$, then we obtain the following expression for the trigram probability sought $$Pr(w|uv)=\lambda_0 f_0+\lambda_1 f(w)+\lambda_2 f(w|v)+\lambda_3 f(w|uv) \tag{1}$$

The actual estimation of the transfer probabilities is effected by means of the so-called "deleted estimation" method (see Jelinek, F. and Mercer, R., "Interpolated Estimation of Markov Source Parameters from Sparse Data", in Pattern Recognition in Practice, Amsterdam, North Holland, 1980, pp. 381–397). In this method, several smaller text random samples are produced by neglecting portions of the text. For every random sample there is an evaluation by the above-mentioned method, relating to word sequence statistics.

The known speech recognition systems have the disadvantage that each word appears as a word form in the vocabulary of the system. For this reason there are relatively large demands on the memory capacity of the system. The generally very extensive vocabularies also have a disadvantageous effect on the speed of the recognition process.

In the paper "Half words as processing units in automatic speech recognition", G. Ruske, Journal "Sprache und Datenverarbeitung", Vol. 8, 1984, Part 1/2, pp. 5–16, it was proposed as a solution to this problem, to establish the smallest processing unit in the field of acoustic-phonetic analysis in automatic speech recognition, to carry out segmentation of the vocabulary into half words. Compared with systems which establish syllables as the basis unit and which build up every vocal statement "like building blocks", this procedure exhibits advantages in respect of storage requirements, etc., because in German, for example, the number of different syllables alone amounts to about 5,000. In addition, the paper makes reference to the advantages of the syllable-oriented segmentation for the higher processing stages of speech recognition, where from relatively securely recognised syllables, word hypotheses are generated. However, the conversion of these hypotheses into a speech model is not covered in the paper.

A particular problem in speech recognition is the compounds which appear relatively frequently in many languages. For example, technical terms occur frequently in the medical field which can be expressed by genitive attributes only in some languages. In known speech recognition systems any compound appears as a single word form in the system vocabulary, as a result of which it creates disadvantages in respect of the system performance, for example, because of the increased demand on memory.

In International Patent Application WO 93/18506, DRAGON SYSTEMS INC., U.S.A., has earlier published a speech recognition system for languages containing compounds, based on the aforementioned problem of increased memory requirements and which avoids the incorporation of compound words in the active vocabulary. It was proposed as a solution to incorporate a special recognition means for compound words. In the case of the possible presence of a composite word this device changes into a particular operating mode in which possible candidate compounds are displayed in the form of a list from which the user has to select the correct compound manually.

It is consequently the object of this invention to provide a method and a system for speech recognition in the case of a language containing compound words, in which the vocabularies in the above-mentioned sense which generally form the basis for the speech recognition systems can be reduced as much as possible and in which all the processing steps of speech recognition can be effected without additional input by the user and in real time.

This object is solved in accordance with the invention of the speech recognition method by the steps of the method proposed in claim 1, which individually involve: storing a quantity of phonetic transcriptions of words and components of compounds in a first storage area; calculating a quantity of N-gram frequencies (language model) for the probability of the appearance of a compound within a sequence of words comprising N words with the aid of a previously processed body of text and storage of this quantity in a second storage area; recording and digitising the acoustic speech signal and storing the digitised speech signals in a third storage area where, by means of signal processing based on the phonetic transcriptions, words and compound boundaries are determined, from which hypothetical sequences of words or compound candidates are derived; applying separate processing paths for sequences of compound and word candidates; statistical evaluation of the processing paths by means of N-gram frequencies, where likelihood profiles are formed from the sequence of N-gram frequencies of the words and/or compound components; together with total evaluation of the paths making use of the acoustic degree of compliance and the statistical probability of the language model.

The speech recognition method in accordance with the invention is predicated on not storing complete compound words in the language model but only constituents of compounds in the form of individual words. The recognition system then only has to select these constituents in the vocabulary. An important aspect of this concept for solution is that separate processing paths are set up for recognising possible compound words for a compound word constituent and for possible separate words, i.e. a different reprocessing of the hypothetical time sequence of candidate words, which are generated during the course of speech recognition as a sequence of phonetic transcriptions of words and constituents of compounds. From these processing paths specific speech pattern statistics are then calculated for compound words to evaluate the word hypotheses.

With the N-gram statistics it has been shown to be particularly advantageous to use word form trigrams. The use of trigrams in speech models has the advantage that an ideal compromise is achieved between memory capacity and processing rate.

In the speech recognition system in accordance with the invention non-vicinal components of a word sequence can also be formed for a candidate component of a compound word W, given a context C, in the speech pattern distant N-gram frequencies Pr(W/C). The basis of speech pattern statistic is a breakdown of the probabilities with which the preceding context and the constituents of a compound word can be considered separately. A key to solving this problem is again provided by the fact recognised in linguistics that grammar-determining components of a compound word are generally to be found at the end of the compound word, where this component provides information on gender, case and number, provided that the compound word is a noun. An analogous situation applies, however, in the case of verbs compounded of several words.

A generalisation of this fact leads to the speech pattern assumption that the context preceding a compound word will have the probability of a marked influence on the last component of the compound word and, vice versa, that if this last component is known, the preceding context will say little about the remaining constituents of the compound word. In the speech model, this corresponds to an N-gram frequency Pr(W/C), i.e. the probability of the last constituent W of a compound word, given the context C. The last constituent W and the context C are in this case non-vicinal parts of the word sequence under consideration.

In the speech recognition system in accordance with the invention, internal N-gram frequencies Pr(A/W), with inverse time sequencing of the constituents of the compound word, can also be formed, given a compound word beginning A, for a compound word end component candidate W. The so-called internal N-gram frequency Pr(A/W) here represents the frequency of the beginning A of the compound word, given the end W of the compound. The assumed probabilities running here in the reverse direction, are again derived from the known fact that, in the majority of languages, the grammar-determining component of a compound word is generally at the end of the word.

In the speech recognition system in accordance with the invention, it is also possible to predict that the evaluation of the speech context concerns both the compound word and the constituents of the compound word. The above-mentioned probability assumptions thus allow the incorporation of the context in that the language model underlying the invention can be more versatile. An evaluation based on constituents of compound words therefore suggests itself particularly when the context contains multiple compound words.

In the speech recognition system in accordance with the invention it is further possible to take into account acoustic slurring or contractions of neighbouring words using a context function. In the case of adjacent beginnings and endings of words, in particular with the beginnings and endings of compound words, these components regularly have a reciprocal influence of one another's behaviour. This finally is the reason why in most languages a tendency can be observed, in the pronunciation of adjacent words or components of compound words, to run these together as far as possible without a transition and without a pause. This problem is very advantageously solved on the basis of the proposed context function.

In the speech recognition system in accordance with the invention it can further be provided that a processing path can be set up for a candidate compound word if a potential beginning component is observed on the grounds of a specific path evaluation to a hypothesis of a compound word. Consequently, a so-called likelihood profile can be calculated on the hypothesis that it is a compound word. The likelihood profile provides a measure of the quality of a processing path. If the compound word hypothesis applies, this profile should turn out more favourable than the alternative path. In this way the automation of the speech recognition process should be considerably simplified.

With the speech recognition system in accordance with the invention it may be further provided that the speech signal can be evaluated to determine probable word or compound word boundaries by means of coarse matching and then a fine tuning subsequently carried out between the acoustic signal and the corresponding candidate word or compound word. In the coarse matching, candidate words or compound words and the times of apparent boundaries of words and/or compound word components are determined and these results tested for whether approximations to components of compound words are present and to see to what extent the candidate compound words agree with the given processing path on the basis of the speech pattern probabilities. In the fine tuning subsequently carried out the general sequence of any compound words found are again compared, if necessary taking into account any slurring using the context function, with the acoustic speech signal and the agreement checked.

It is further provided with the speech recognition system in accordance with the invention that access is provided for every processing path to appropriate speech pattern data blocks. This will avoid having to make the whole speech pattern continuously available on every processing path for every test. On the basis of this access to data blocks, the processing speed of the recognition system will again be increased.

The advantages of the further embodiments of the invention characterised in sub-claims 9 to 11, compared with the state of the art, will be described in detail in the description of the drawing.

It is also an object of the invention to provide a speech recognition system in which the speech recognition system in accordance with the invention is used. This system comprises in accordance with the invention, a device for recording acoustic speech signals, a device for digitising the analog acoustic speech signal, a device for constructing a number of phonetic transcriptions of words and components of compound words, a device for constructing lists relating to single words, beginnings of compound words and endings of compound words, a device for determining the speech pattern probabilities for each on a processing path for these three lists, a device for determining likelihood profiles for hypothetical word or compound word sequences and a device for producing and cancelling processing paths and for deciding on the production and cancellation of processing paths. Within the framework of the speech recognition process each list is checked under various conditions, e.g. contexts. An advantage of this arrangement over state of the art speech recognition systems, is the ability to automate the speech recognition system fully, independent of the dictation conditions. In addition, the speech recognition can take place in real time. Other advantages of the invention will appear from the description of the drawing.

With the speech recognition system in accordance with the invention a device may further be provided to recognise components of compound words as beginnings or endings. The recognition can, for example, be effected by flagging. An advantage of this system is the raising of the speed of this recognition sub-process, as a result of which the performance of the whole system is increased.

The advantageous form of the speech recognition system in accordance with the invention under Sub-Claims 14 to 16 will be considered in more detail in the description of the drawing.

BRIEF DESCRIPTION OF THE INVENTION

The speech recognition method and the system for speech recognition in accordance with the invention will be described below in more detail with the aid of the drawings using the treatment of compound words in the German language as an example.

DETAILED DESCRIPTION OF THE INVENTION

Figure 1:
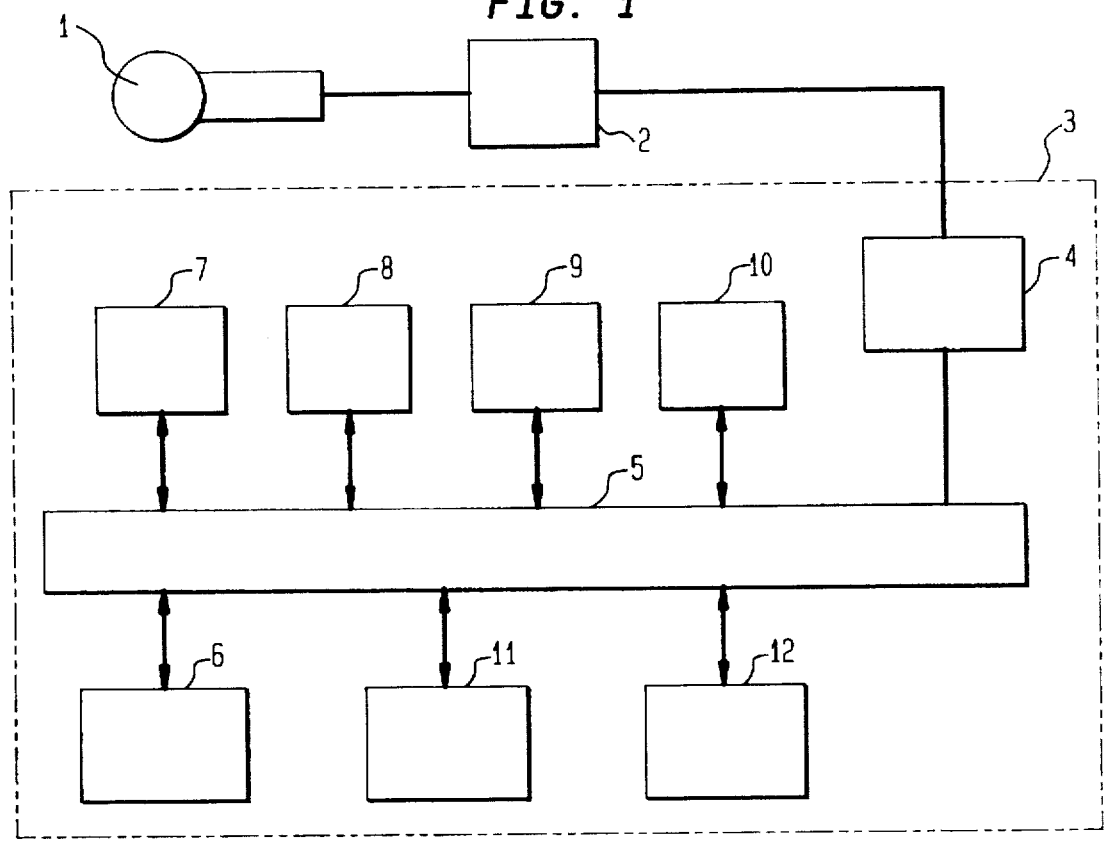
Figure 2:
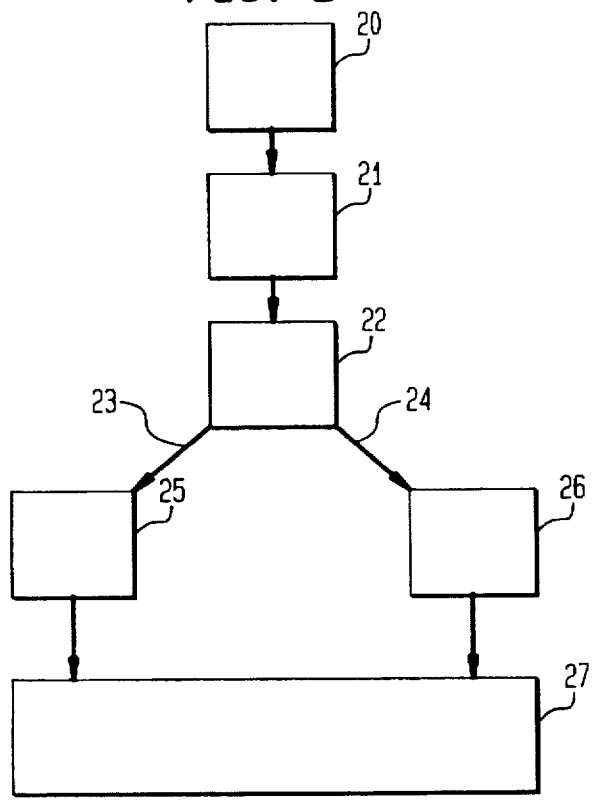

FIG. 1 shows a diagrammatic representation of the speech recognition system in accordance with the invention; and FIG. 2 shows the functions of the speech recognition system in accordance with FIG. 1 in recognising German language compound words by means of a block diagram.

In the speech recognition system shown in FIG. 1 the speech signal is first recorded using a microphone 1. Instead of using a microphone, however, the speech signal may also have been stored previously on a storage mediums for example, on a dictating machine. This signal is converted by means of an analog/digital converter 2 into an electronically reprocessable digital signal.

The reprocessing of the digital signal is effected by means of a processor unit 3. The digital signal, through an input channel 4, reaches a bus line 5 of the processor unit 3, through which a central processing unit 6, storage areas 7, 8, 9 and 10, a decoder 11 and a likelihood-processor 12 communicate with one another.

The storage areas 7, 8, 9 and 10 may, however, also be integrated into a single storage unit. Storage area 7 stores the phonetic transcriptions produced by the processing of the acoustic signals in the decoder 11. Thereafter spoken words are represented by acoustic-phonetic images. Storage area 8 stores lists of simple words, compound word beginnings and endings previously produced, for example, by means of the central processing unit 6. The N-gram frequencies forming the language model are in storage area 9 and were previously produced from the body of text specific to each application. Finally, storage area 10 stores the digital speech signal to be investigated.

In the speech recognition of compound words in accordance with the block diagram in FIG. 2 it is first assumed that the components of the compound words were run together in dictation, so that the transitions between the components of the compound word appear quite different acoustically from those dictated as discrete units. By means of a coarse matching 20, which identifies candidate compound words to a first approximation on the basis of a prepared vocabulary, points in time of apparent word and compound word boundaries are first determined. Since the compound word components appear in the vocabulary as separate words, the coarse matching 20 can determine a similar compound word boundary time point at the end of each constituent.

In conjunction with this, using the language model probability a check 21 is made on how the candidates determined by the coarse matching fit in the given processing path. Within the framework of this check 21 it is then possible by means of the branch 22 in the processing path to test for possible compound words. The branch into two different paths only represents an advantageous embodiment of the invention. It is, of course, also possible to consider branches into three or more paths.

In addition, for each processing path 23, 24, a fine matching 25, 26 between acoustic signals and compound word candidates is carried out. In the case of a processing path for a compound word hypothesis ("Compound word path"), searching for the acoustic symbol sequence given by the acoustic linking together of the components of the compound word is carried out and not for individual constituents. To take into account slurring of neighbouring constituents of the compound word, a context function 27 is also available.

In accordance with the language model on which the invention is based, the resultant probability of a compound word constituent depends, on the one hand, on the source context, i.e. the words which constitute the compound word, and, on the other hand, on the beginning of the compound word itself. The determined probability of the initial part of a compound word will not differ from that of the same word as an individual word. It is simply that only one processing path is employed for the individual word hypothesis and one processing path for the compound word hypothesis.

The result is a breakdown of the probabilities, with which the context preceding a compound word and the components of a compound word can be considered separately. A starting point for the solution of this problem is the fact, known from linguistics, that in German the grammar-determining part of a compound word is regularly located at the end of the compound word. The component found at the end of a compound word thus provides information on the gender, case and number if the compound word is a noun. The same applies for verbal compounds.

To generalise this fact it is further assumed that the source context in which the compound word appears has a considerable influence on the probability of the last component of the compound word and, vice versa, provided that the last component is known, the source context says little about the remaining constituents of the compound.

On the assumption, derived from probability theory, of independent occurrences this means that, given the last component of the compound word, the preceding components and the source context are to some extent independent. If the last component of the compound word is designated W, the preceding component A and the source context C, a trigram probability of the word W as compound word end component after the beginning A in context C is expressed as:

$$Pr(W|CA) = \frac{Pr(A|CW)Pr(W|C)}{Pr(A|C)} = \frac{Pr(A|W)Pr(W|C)}{Pr(A|C)} \quad (2)$$

Two different trigram probabilities appear in this expression: Pr(A|W) and Pr(W|C), that is, the probability of the beginning of the compound word A, given the last component of the compound word W and that of the last component W, given the context C. In particular, a so-called distant trigram (C, W) is formed in this way over not immediately adjacent parts of the spoken expression. In addition, a probability Pr(A|W) also appears in the mathematical expression (2). This probability of the initial part of the compound word A, given the end component of the compound word W, corresponds to a consideration of probability carried out within the compound word. It is worth noting in this connection that these probabilities do not occur sequentially in the same time sequence as the words.

In implementing these language models an inter-compound bigram speech pattern is produced, which contains so-called assessors of the probabilities mentioned from spoken texts, which are stored in memory with efficient access formats. The novelty in this model is that the inter-compound probabilities are estimated separately, and that this estimate runs counter to the time direction of the spoken language.

In this technical implementation of the inter-compound model it is necessary to distinguish three routines: An access to data blocks, an access to data for individual candidates and the calculation of the current path evaluation.

The access to data blocks takes place at the start of acoustic processing of the signal by means of a decoder. There are then first a number of processing paths available. For each path the language model data block is first sought which corresponds to the preceding context. In the case of the compound word model, when a path ends with a candidate initial component of a compound word, data blocks with the conditional probabilities of these candidates are read in under all possible terminations. Suitable flags are introduced both for initial components of compound words and also for end components. In this way it is possible for the speech recognition system in accordance with the invention to recognise that there is a compound word path present and in this case to load the appropriate data blocks for this path.

For the parts of the spoken phrase currently investigated a list of candidates is first produced by means of a coarse matching.

Here, the following cases should be distinguished:

1. If the candidate compound is the first component of a potential compound word, a standard trigram probability is considered in the context. If this is sufficiently high, the processing path, at the end of which is the candidate compound word, branches. On one arm the compound word hypothesis is tested and on the other, that for the individual word.

2. If the candidate compound word is a second or third part of a compound word of a compound word path which has already been started, the trigram model will return an evaluation of zero. The compound bigram model will return the probability of the new starting component, given the preceding part. For this, it is necessary to calculate the so-called Bayes Theorem (Spies, M., "Unsicheres Wissen", Berlin, Heidelberg, 1993, Spektrum Akademischer Verlag), since the probabilities are stored in inverted sequence of terms.

3. If the candidate compound word is the ending of a compound word, the trigram model gives the language model probabilities of the corresponding distant trigram. The compound word bigram model supplies the inter-compound word probability of the end component, given the last observed starting component.

4. If the candidate compound word can be both starting component and end component, the current processing path must again be branched, on one hand for the testing of the end component of the compound word and, on the other hand, for that of the least second compound word starting component. If this branching is carried out, an evaluation of the language model is carried out for the current processing path as in the above-described case.

5. Finally, if the candidate compound word is neither starting nor ending component, the compound word bigram model returns a value of zero; this then leads to an interruption of the compound word path as the result of a decision function which is already present in the decoder.

Use of the Method on a Multiple Compound

It will first be assumed that the influence of the context words and the starting component of a compound word is a combination of the following independent components:

a) end component of the compound word, given the context; and b) the starting component of the compound word, given its end component.

This breakdown of the probabilities is equivalent to the assumption that with a given end component of the compound word the start of the compound word is independent of the context. With this premise, and with the initial components h1 . . . hn of the compound word, the end component t of the compound word and the two words w1 and w2 immediately preceding the compound word, then the following relationship holds:

$$Pr(t|w_1 w_2 h_1 \ldots h_n) = \frac{Pr(h_1 \ldots h_n|t)Pr(t|w_1 w_2)}{Pr(h_1 \ldots h_n|w_1 w_2)} \quad (3)$$

A further assumption implies that an initial component of a multiple compound, which is not also a start of a word, can be described in the intercompound statistics sufficiently well through the probability under the condition of the immediately preceding starting component. Accordingly, the following equation applies:

$$Pr(h_i|h_{i-1} \ldots h_1 w_1 w_2) = Pr(h_i|h_{i-1}) \quad (n \geq i > 1) \quad (4)$$

Finally, it is assumed that the influence of the end component of the compound word on all initial components of the compound word can be broken down into independent contributions of the end component on the last starting component and the remaining starting components on their relevant predecessor.

$$Pr(h_1 \ldots h_n|t) = Pr(h_1|h_2) \ldots Pr(h_{n-1}|h_n)Pr(h_n|t) \quad (5)$$

From these assumptions, it is possible to derive a conclusion which is of importance for implementation, namely that a standard trigram probability is to be employed for the first starting component of the compound word and that for the subsequent starting components the probability consists of the product of individual inter-compound bigram probabilities. The corresponding mathematical expression is:

$$Pr(w_1 w_2 h_1 \ldots h_n t) = Pr(w_1)Pr(w_2|w_1)Pr(h_1|w_1 w_2)$$

$$\prod_{i=2}^{n} Pr(h_i|h_{i-1}) \frac{Pr(h_1 \ldots h_n|t)Pr(t|w_1 w_2)}{Pr(h_1 \ldots h_n|w_1 w_2)} \quad (6)$$

According to this, it is only necessary to take into consideration for each constituent a comparatively easily determinable probability in processing a multiple compound word. With this method the processing path for each constituent of a compound word can be correctly evaluated.

With the foregoing assumption, we finally get the equation:

$$Pr(h_1 \ldots h_n|w_1 w_2) = Pr(h_1|w_1 w_2) \prod_{i=2}^{n} Pr(h_i|h_{i-1}) \quad (7)$$

For calculating the standardised probability of the end component of a compound word it is accordingly then only necessary to multiply the coefficient Pr(hi|hi−1) appearing on the processing path throughout the entire compound word, as a result of which the implementation of the method is substantially facilitated.

I claim:

1. A method for speech recognition in languages with compound words, comprising the following steps:

storing phonetic transcriptions of words and components of compound words in a first storage area, calculating n-gram frequencies (language model) for the probability of a compound word within a sequence of N words with use of a previously processed body of text, and storing the frequencies in a second storage area;

recording and digitizing the acoustic speech signal and storing the digitized speech signal in a third storage area, wherein by means of signal processing based on the phonetic transcriptions, approximately determining the words and boundaries of compound words and deriving hypothetical sequences of words or candidates for compound words therefrom;

establishing separate processing paths for sequences of candidates for words and compound words;

statistically evaluating the processing paths by means of the n-gram frequencies, where likelihood profiles are generated from the sequence of n-gram frequencies of words or components of compound words of each processing path; and fully evaluating the processing paths with regard to the goodness of acoustic fit and the statistical probability of the language model.

2. A speech recognition method in accordance with claim 1, characterized in that distant N-gram frequencies Pr(W/C) in the language model of non-vicinal parts of a sequence of words are formed for a candidate compound word component W, given a context C.

3. A speech recognition method in accordance claim 2, characterized in that in the language model internal N-gram frequencies Pr(A/W) in inverse time sequence of compound word components are formed for a candidate compound word end component W, given a compound word start A.

4. A speech recognition method in accordance with claim 3, characterized in that the evaluation of the language context takes into account both compound words and components of composite words.

5. A speech recognition method in accordance with claim 4, characterized in that acoustic slurring or contractions of neighboring words are taken into account by means of a context function.

6. A speech recognition method in accordance with claim 5, characterized in that a processing path is set up for candidate compound words if a potential starting component is observed on the basis of an evaluation of a specific path to a compound word hypothesis.

7. A speech recognition method in accordance with claim 6, characterized in that the speech signal is evaluated by means of a coarse matching to determine the likelihood of word or compound word boundaries and a fine matching is subsequently carried out between the acoustic signal and the corresponding word or compound word candidates.

8. A speech recognition method in accordance with claim 7, characterized in that for each processing path there are accesses to relevant language model data blocks.

9. A speech recognition method in accordance with claim 8, characterized in that for calculating the probability of a component of a compound word use is made of the preceding context and the initial component of the compound word.

10. A speech recognition method in accordance with claim 9, characterized in that a probability Pr(W/CA) of a constituent of a compound word W as an end component of a compound word behind a starting component of a compound word A is determined taking into account the preceding context C composed of two words or compound words, from the standardized product of the probability Pr(A/W) of an internal bigram formed within the compound word and the probability Pr(W/C) of a distant trigram formed outside the compound word.

11. A speech recognition method in accordance with claim 9 for languages containing multiple compound words, characterized in that assuming that with a given termination the start of a compound word is independent of the context, that an initial component of a multiple compound word not standing at the beginning of a compound word is determined by the probability $Pr(A_i/A_{i-1})$ of its sequence on the immediately preceding starting component, and that the influence of the termination on all starting components of the compound word can be broken down into independent contributions of the terminal part on the last starting component and the remaining starting components on their corresponding predecessors, for calculating the standardized probability of the compound word termination on a processing path is multiplied by the path coefficients appearing through the compound word.

12. A system for speech recognition in languages containing compound words comprising:

recording means for recording acoustic speech signals;

A/D converter means for digitizing the analog acoustic speech signal;

phonetic transcription means for constructing a number of phonetic transcriptions of words and components of compound words;

listing means for constructing lists relating to single words, beginnings of compound words and endings of compound words;

probability means for determining the speech pattern probabilities for each on a processing path for the lists;

profiling means for determining likelihood profiles for hypothetical word or compound word sequences; and processing path means for producing and cancelling processing paths and for deciding on the production and cancellation of processing paths.

13. A speech recognition system in accordance with claim 12, including means for characterizing compound word constituents as starting or terminating components.

14. A speech recognition system in accordance with claim 13 with means for setting up and loading of data blocks of language model probabilities.

15. A speech recognition system in accordance with claim 14 including means for preparing any desired number of composite models in the form of language model classes.

16. A speech recognition system in accordance with claim 15 including means for setting up a context function.

* * * * *